US007882066B1

(12) United States Patent
Kiselev et al.

(10) Patent No.: US 7,882,066 B1
(45) Date of Patent: Feb. 1, 2011

(54) PROBABILISTIC DATA LOCATING IN SPARSE DATA IMAGES

(75) Inventors: Oleg Kiselev, Palo Alto, CA (US); John A. Muth, Scotts Valley, CA (US)

(73) Assignee: Symantec Operating Corporation, Mountain View, CA (US)

( * ) Notice: Subject to any disclaimer, the term of this patent is extended or adjusted under 35 U.S.C. 154(b) by 2017 days.

(21) Appl. No.: 10/852,836

(22) Filed: May 25, 2004

(51) Int. Cl.
*G06F 7/00* (2006.01)
*G06F 12/00* (2006.01)
*G06F 15/16* (2006.01)
*G06F 17/30* (2006.01)

(52) U.S. Cl. .................. 707/634; 707/638; 707/639; 707/640; 707/665; 707/695; 707/899

(58) Field of Classification Search ................ 707/203, 707/634, 638, 639, 640, 665, 695, 899
See application file for complete search history.

(56) References Cited

U.S. PATENT DOCUMENTS

| 5,423,015 | A | * | 6/1995 | Chung | 711/108 |
| 5,987,464 | A | * | 11/1999 | Schneider | 707/10 |
| 6,085,226 | A | * | 7/2000 | Horvitz | 709/203 |
| 6,385,641 | B1 | * | 5/2002 | Jiang et al. | 709/203 |
| 6,598,075 | B1 | * | 7/2003 | Ogdon et al. | 709/204 |
| 6,604,118 | B2 | * | 8/2003 | Kleiman et al. | 1/1 |
| 6,950,989 | B2 | * | 9/2005 | Rosenzweig et al. | 715/721 |
| 7,065,540 | B2 | * | 6/2006 | Chandrasekaran et al. | 707/203 |
| 7,228,306 | B1 | * | 6/2007 | Altman et al. | 707/100 |
| 7,277,870 | B2 | * | 10/2007 | Mourad et al. | 705/51 |
| 7,321,892 | B2 | * | 1/2008 | Vadon et al. | 707/767 |
| 7,526,623 | B1 | * | 4/2009 | Rao | 711/162 |

OTHER PUBLICATIONS

Tsotras et al., "The Snapshot Index: an I/O-optimal access method for timeslice queries," Information Services, ISSN 0306-4379, vol. 20, Issue 3, May 1995, (pp. 237-260).

* cited by examiner

*Primary Examiner*—Doug Hutton
*Assistant Examiner*—Soumya Dasgupta
(74) *Attorney, Agent, or Firm*—Robert C. Kowert; Meyertons, Hood, Kivlin, Kowert & Goetzel, P.C.

(57) ABSTRACT

A set of probabilities may indicate the chance of finding the latest version of a data item in any particular data image layer of a data image. A client may use the set of probabilities to request the data item from one or more layers that have a higher probability of having that version of the data item. A client may query more recently created layers to determine whether they have a version of the data item. If any of the more recently created data image layers has a version of the data item, a client may request the data item from the most recent of the more recently created layers and may discard any data returned from the originally requested layer. A client may update the historical probabilities based on which layers contain versions of the data item.

18 Claims, 6 Drawing Sheets

PROBABILISTIC DATA LOCATING IN SPARSE DATA IMAGES

BACKGROUND OF THE INVENTION

1. Field of the Invention

This invention relates to computer systems in general, and more particularly to data storage.

2. Description of the Related Art

Modern storage environments may include many interconnected storage objects. The interconnection network is a physical-layer technology that provides the infrastructure to connect the various elements of a shared storage environment. Within the shared storage environment, file system abstractions may be built on top of volumes that may themselves be distributed across multiple storage devices. As the number of volumes and file system abstractions grows, the complexity of the entire storage environment grows dramatically.

To limit bottlenecking and improve data throughput, some storage management and access functions and operations traditionally performed by the computer systems may be moved out to other systems or into the storage itself. Object-based storage devices (OBSDs) are one example of the type of storage devices that may allow some or all low-level storage allocation to be relocated from their traditional placement in the servers and into the OBSDs themselves. Another example of a storage system that off-loads storage management from the server is a Network Attached Storage (NAS), which is a specialized file server computer appliance, sometimes referred to as a "filer".

Yet another approach is taken by distributed shared storage environments, which may separate the actual storage of data from the management of that data. Storage architectures that employ this technique may be referred to as out-of-band or asymmetric systems. A metadata server (MDS) may provide higher-level data management and control functions including, among others, file system mapping, data mirror synchronization, client authentication and access privileges. The data itself is generally stored on various storage devices attached to the network. Without the need to worry about providing file system abstractions, or other metadata, storage devices may focus on providing only data storage and retrieval. Object-based storage devices (OBSDs) are one example of the type of storage devices that may be employed in out-of-band or asymmetric systems.

When utilizing distributed, or asymmetric storage, client nodes may initially contact the MDS to request access to a specific dataset. The MDS, after authenticating the client node and applying whatever access policies are in place, may generally provide the requesting client node with information about where that particular dataset is stored (metadata), and an access token to present to the storage device. Client nodes may then communicate directly with storage devices, presenting the access token for reading and writing of data. The access token tells the storage device what data the client node is allowed to access, and also whether that client is allowed read/write access, or merely read-only access.

Separating data from its associated metadata can allow the actual data traffic to be routed directly to the storage device, thus preventing the MDS from becoming a bottleneck and limiting data throughput. This also may allow the MDS to be optimized for metadata lookups which usually involves smaller reads and writes, while allowing the storage devices to be optimized for bulk data transfer of block reads and writes.

One type of storage device that may be used in shared storage environments is the Network Attached Storage (NAS). NAS provides clients access to file objects, comprising a logical collection of bytes on the storage devices, with certain metadata that stores file's attributes. Files represent a storage abstraction that can represent application specific structures such as documents, database tables, images or other media. Meta file systems built using NAS filers may use multiple files distributed among multiple NAS filers to store their files.

Another type of storage device that may be used in shared storage environments is the object-based storage device (OBSD). OBSDs provide clients with access to variable size data objects, comprising a logical collection of bytes on the storage device, similar to files provided by NAS filers, but with interfaces and characteristics that are more like those of traditional disk devices. File systems built around OBSDs may use multiple objects per data file.

File systems may need to store multiple versions of the same file, preserving old file versions for back up, regulatory compliance or multiple clients parallel access to the data. For example, in distributed file systems where multiple client nodes may simultaneously access the same data, files may be fixed into specific versions to ensure data integrity among client sessions. In other deployments, a specific data image of a file as of specific point in time may be preserved for backup, while allowing applications to access and modify a more current version of the file. In yet other deployments the file system may preserve all versions of a data file over its lifetime in order to meet certain legal requirements for data tracking and preservation. These dataset versions are typically referred to as data images or snapshots. Snapshots may include one or more logical data layers that comprise a specific version of the data image. Snapshots may be stored on sparse data objects or file objects, where each object may store changes or additions compared to the data in other objects of the snapshot. Thus, any individual sparse data or file object may contain holes in its data representation. Storage devices may be configured to expose the presence of these holes. Locating a specific piece of data from within a sparse data image generally involves attempting to read the data from each sparse data or file object iteratively, usually starting with the most current version, until the correct version of the data is found.

SUMMARY

In shared storage environments, specific versions of data may be located within a sparse data image using accumulated historical probabilities.

In order to locate the most recent version of a data item, a client may obtain a set of probabilities indicating the chance of finding the latest version of that data item in any particular layer of the data image. The client may request the data item from the layer that has the highest probability of having that data item, based on the historical success of finding the most recent version of that data item in that particular layer. Since additional data image layers may have been created since the last time the data item was acquired, and since any of them could contain more recent versions of the data item, the client may query one or more of these more recent data image layers to determine whether they have a version of the data item. Data image layers may be stored on data objects that may be configured to return the presence of a particular data item or whether a hole exists at that logical data location. The query may request the data stored in the data image layers, discarding the data that doesn't represent the desired version of the data. Alternatively, the query may request only the information on the presence or absence of data and request the data transfer only after determining which data image layer has the copy of the image the client is interested in.

A client may query every more recent data image layer. If any of the more recently created data image layers responds that they have a version of the desired data item, the client may then request the data item from the most recent of the more recently created data image layers and may discard any data returned from the originally requested data image layer. The client may update the probabilities based on the currently discovered location of the data item.

Figure 1:
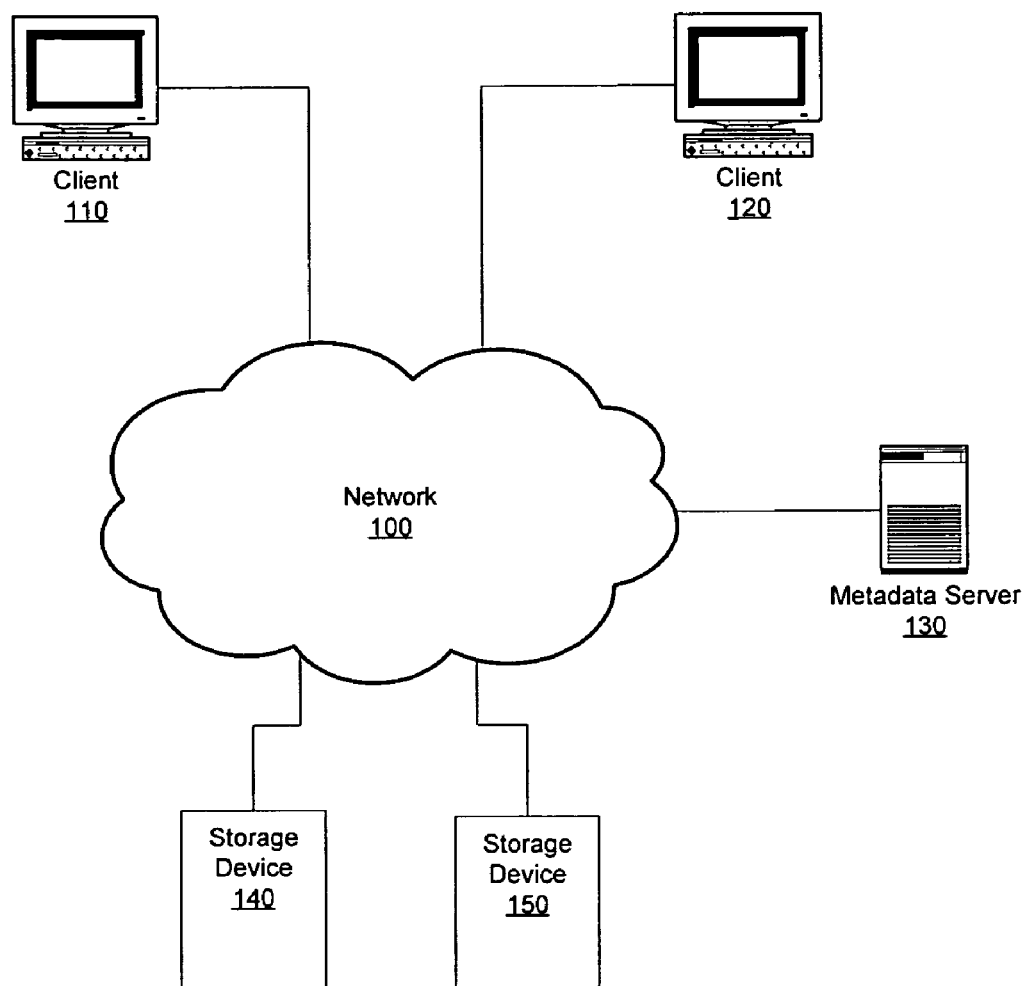
FIG. 1 illustrates, according to one embodiment, a networked system including various computer devices that may be configured to implement probabilistic data locating in a sparse data images.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and such usage is not meant to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

It should also be noted that capitalization is used in the following descriptions to refer to various objects in the drawings. Such capitalization is used for descriptive clarity only and is not intended to limit the scope of the description or the claims.

DETAILED DESCRIPTION OF EMBODIMENTS

FIG. 1 illustrates a computer network, according to certain embodiments, in which one or more devices may be configured to implement probabilistic data locating in sparse data images. In such an embodiment, at least one computing device on Network 100 may be a client device, such as Client 110 or Client 120 with installed software that may be configured to communicate with other devices, read from sparse data images, obtain and maintain data location probabilities, and exchange data with storage devices. In one embodiment, at least one computing device on Network 100 may be a server device, such as Metadata Server 130 with installed software that may be configured to communicate with other devices, read from sparse data images, obtain, maintain, and provide data location probabilities, and exchange data with storage devices. Metadata Server 130 may also be configured as a client device similar to Client 110 and Client 120. According to some embodiments, one or more devices may be storage devices, such as Storage Device 140 and Storage Device 150. Storage Device 140 and Storage Device 150 may be configured to provide data storage and retrieval services to other devices, such as Client 110, Client 120 and Metadata Server 130. Client devices, such as Client 110 or Client 120, may be configured to communicate with Metadata Server 130 and request a set of probabilities relating to the location of a particular data item within a data image. Metadata Server 130 may in turn provide Client 110 or Client 120 with the current set of probabilities relating to the particular data item. In some embodiments a single computing device may contain both the Metadata Server and Client components.

According to some embodiments, a data image may include one or more data image layers, which utilize sparse data objects on one or more storage devices, such as Storage Device 140 or Storage Device 150, where each sparse data object may store changes or additions compared to other objects in the data image. In some embodiments, a data image may represent multiple files or may represent the contents of an entire file system.

In certain embodiments, Metadata Server 130 may provide clients with probability sets relating to the historical location of data items among the layers of a data image. Once a client has gathered additional probability data from locating more recent versions of a data time in the data image, the client may provide this information to the metadata server and the metadata server may update the current set of probabilities based on that information.

In some embodiments, a storage device, such as Storage Device 140 or Storage Device 150 may implement data images as sparse data objects. In such an embodiment, a single sparse data object may logically represent the entire data image but may not use physical storage for the entire file. Such a sparse data object may only utilize physical memory as new data additions or changes are written to the data image. A data image may span several sparse data objects, or even span multiple storage devices, in some embodiments. Thus, any individual data object, and therefore any individual data image layer may contain holes in its data representation. Storage Devices 140 and 150 may be configured to expose the presence of these holes when Client 110, Client 120 or Metadata Server 130 tries to read data from a sparse data object. When attempting to read a particular data item from a data image layer, and therefore from a particular sparse data object, Client 110 may encounter a hole and may then attempt to read that data item from a different layer in the data image. According to some embodiments, Storage Devices 140 and 150 may be configured to reveal the presence of holes to Client 110. In one embodiment, Storage Device 140 may be configured to return a status code indicating the presence of a hole when Client 110 attempts to read data from Storage Device 140.

A client device, such as Client 110 or Client 120, may be any of various types of devices, including, but not limited to, a personal computer system, desktop computer, laptop or notebook computer, mainframe computer system, handheld computer, workstation, network computer, a consumer device such as a mobile phone, pager, PDA, a smart appliance, or any type of networkable peripheral device such as storage devices, switches, modems, routers, etc, or in general any type of networkable computing device capable of communicating with directly or network attached storage devices and with other processes or computing devices.

Network 100, as illustrated in FIG. 1, may comprise any of various network technology according to various embodiments. Network 100 may be a local area network, wide area network, intranet network, Internet network, or many other types of network. Network 100 may be designed to be continuously available (although network outages may occur), or may be intermittent (e.g. a modem connection made between a computer system in a user's home and a computer system in a user's workplace). Network 100 may utilize any of a number of different physical networking technologies including, but not limited to, Fiber Channel, Ethernet, Fast-Ethernet, Gigabit-Ethernet, Myrinet, VAX CI, or ServerNet, or others. Network 100 may be configured according to a number of different network topologies including, but not limited to, star, token-ring, token-bus, scatternet, dual-ring, mesh, etc. Network 100 may also be configured to utilize a combination of different networking technologies and/or topologies. Additionally, Network 100 may comprise shared storage or shared memory for communicating between different computer systems or between processes within the same computer system, according to some embodiments. In some embodiments, Network 100 may be the interconnect network for any of various distributed shared storage environments, including, but not limited to, network file system (NFS), common Internet file system (CIFS), storage area network (SAN), network attached storage (NAS), storage-network aggregation, multi-site block storage, object-based storage devices (OBSDs), or other asymmetric, out-of-band, or shared storage models.

A server device, such as Metadata Server 130, may be any of various types of devices, including, but not limited to, a personal computer system, desktop computer, laptop or notebook computer, mainframe computer system, handheld computer, workstation, network computer, a consumer device such as a mobile phone, pager, PDA, a smart appliance, or any type of networkable peripheral device such as storage devices, switches, modems, routers, etc, or in general any type of networkable computing device capable communicating with other processes or devices in a distributed shared storage environment. Metadata Server 130 may be configured to couple over network 100 to one or more other devices via one or more wired or wireless network interfaces. In certain embodiments, Metadata Server 130 may also be configured to co-reside with other services on a client device, such as Client 110.

A storage device, such as Storage Device 140 or Storage Device 150, may be any type of networkable computing device capable communicating with and providing data storage services to other devices or processes. According to various embodiments, Storage Device 140 and Storage Device 150 may be configured to implement any of numerous data storage models including but not limited to, directly attached storage, storage-network aggregation (SNA), network attached storage (NAS), storage area network (SAN), Redundant Array of Independent (or Inexpensive) Disks (RAID), or object-based storage. In certain embodiments, Storage Device 140 may be configured to implement a combination of different data storage models. Storage Device 140 may utilize one or more of numerous types of storage media including but not limited to Hard disk storage, floppy disk storage, removable disk storage, flash memory and random access memory (RAM) are examples of storage media. The terms "storage" and "storage medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The storage medium may include other types of storage as well, or combinations thereof.

Figure 2:
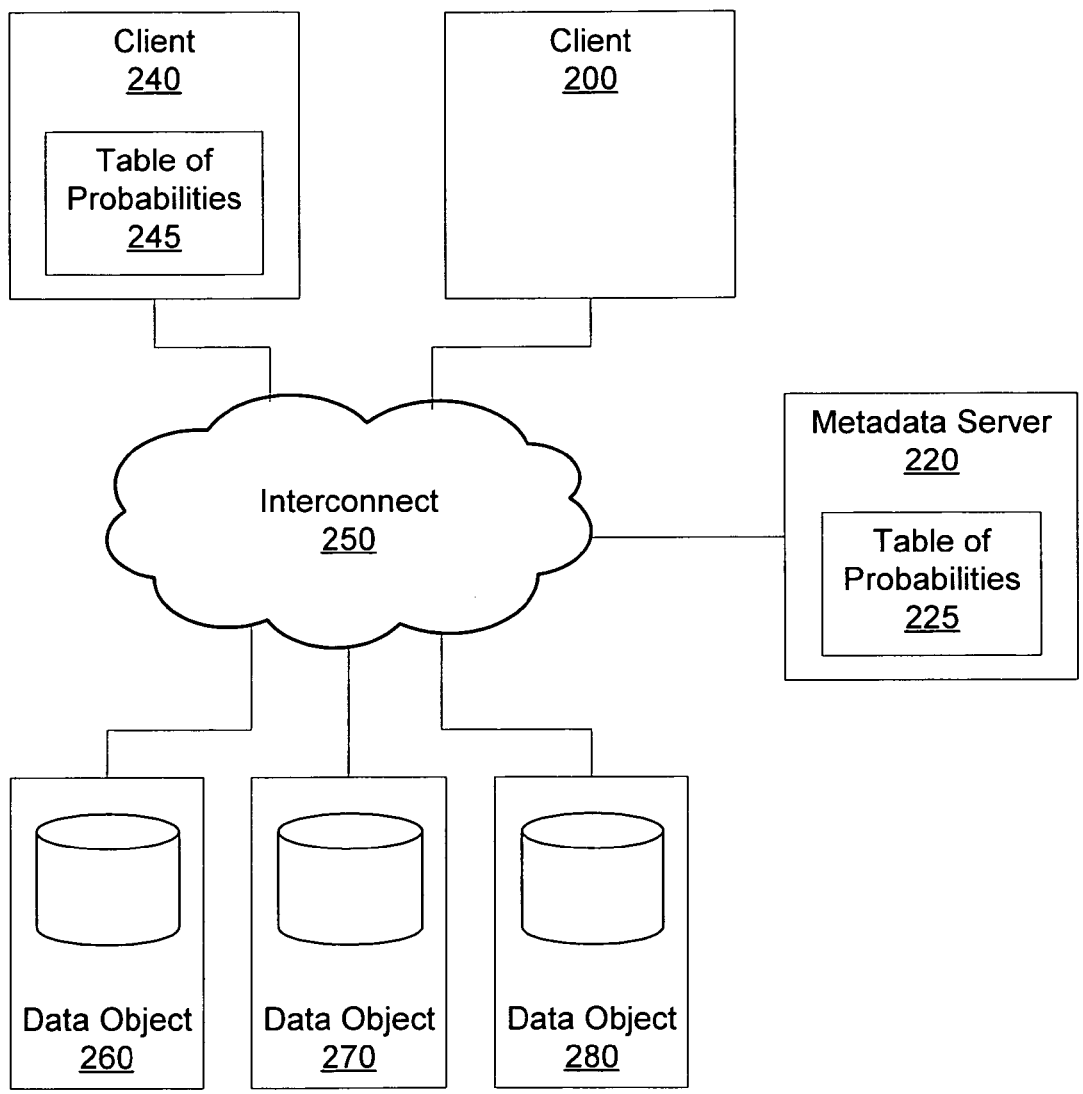
FIG. 2 is a block diagram illustrating the maintaining of probabilities for use with probabilistic data locating in sparse data images, in one embodiment.

FIG. 2 illustrates, according to one embodiment, two clients in a distributed shared storage environment using a table of probabilities to locate data stored in sparse data objects. In one embodiment, a data image with multiple data image layers may be stored in multiple data objects, such as Data Objects 260, 270 and 280. Data Objects 260, 270 and 280 may be stored on the same or multiple storage devices, such as Storage Devices 140 or 150, according to various embodiments. Clients, such as Clients 200 and 240, may communicate across Interconnect 250 with storage devices to read data from Data Objects 260, 270 and 280.

When attempting to locate the most recent version of a data item from within the data image stored on Data Objects 260, 270 and 280, Client 240 may use Table of Probabilities 245 to determine which data image layers are most likely to contain the most recent version of the data item. The table of probabilities 245 may indicate the likelihood of any particular layer in the data image including the most recent version of the data item.

In one embodiment, Client 240 may create and maintain its own set of probabilities relating to the location of the most recent versions of data items within the data image stored on Data Objects 260, 270, and 280. In other embodiments, however, a client, such as Client 200 may rely upon a metadata server, such as Metadata Server 220 to maintain and provide probabilities for locating data within a data image. In one embodiment, Metadata Server 220 may maintain Table of Probabilities 225 in order to provide them to requesting clients. Client 200 may request a set of probabilities from Metadata Server 220 before attempting to locate data items in a data image. In one embodiment, Metadata Server 220 may provide these probabilities as part of the normal metadata provided when Client 200 requests read access to the data image. In other embodiments, Client 200 may request such probabilities separately from other metadata. In some embodiments, Client 200 may periodically request an updated version of the probabilities in case another client, such as Client 240 has provided Metadata Server 200 with updated information regarding the location of data items in the shared data image. Metadata Server 220 may not know when data items are written to a data image, and therefore may rely upon Client 200 and Client 240 to provide updated data location success and failure information to integrate into Table of Probabilities 225.

In one embodiment, Client 240 may locate the most recent version of a data item in a different image layer from the one indicated by Table of Probabilities 245 as being most likely to contain it. In such an embodiment, Client 240 may update Table of Probabilities 245 to reflect the current location of the most recent version of the data item. Client 240 may also provide such information to Metadata Server 220 so that Metadata Server 220 may update the Table of Probabilities 225 accordingly.

Figure 3:
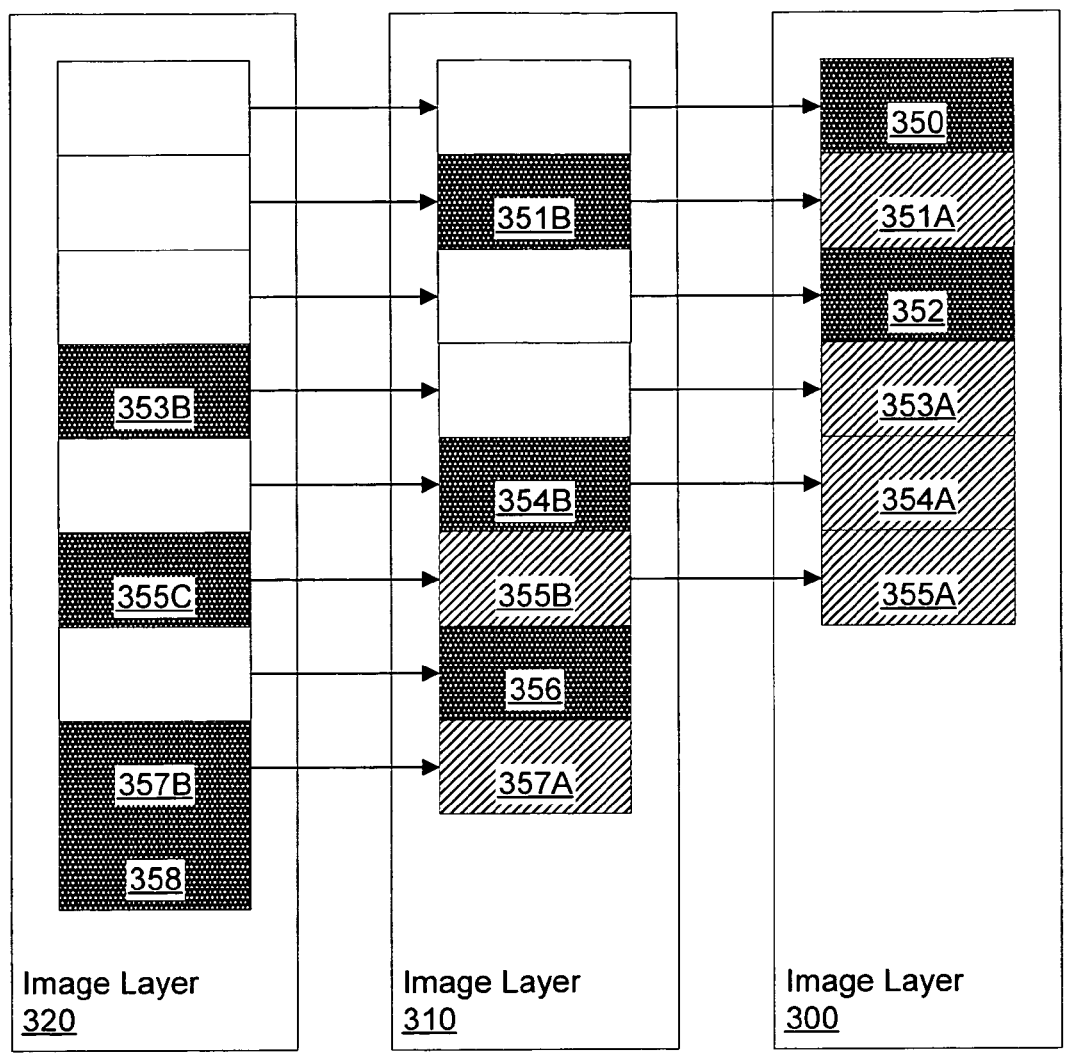
FIG. 3 is a block diagram illustrating, according to one embodiment, sparse data images arranged in image layers.

FIG. 3 illustrates a data image including three data image layers, according to one embodiment. Image Layer 300 may be the oldest data image layer while Image Layer 320 may be the most recent data image layer, with Image Layer 310 being older than Image Layer 320, but more recent than Image Layer 300. In one embodiment, Image Layer 300 may contain 6 individual data items, while Image Layer 310 may include two additional data items and Image Layer 320 may include yet one more data item than Image Layer 330, for a total of 9 data items. In other embodiments, data image layers may include many more data items and a data image may include many more data image layers than illustrated by FIG. 3 and discuss herein.

As illustrated in FIG. 3, and according to one embodiment, individual data image layers may not include versions of every data item. As described above, sparse data images may include data image layers that may store data modifications or additions as compared to other layers in the data image. For example, Image Layer 300 may include the most recent versions of data items 350 and 352. Image Layers 310 and 320 may include holes in those logical locations. Similarly, Image Layer 300 may include the original versions of data items, 351, 353, 354, and 355, while Image Layers 310 and 320 may include the most recent versions of data items 351, 354, 353 and 355, respectively.

As illustrated by the different shadings in FIG. 3, a data image layer may include either a version of a data item or a hole. For example, Image Layer 300 may include the only version of data item 350, while Image Layers 310 and 320 may have holes in that logical location rather than including more recent versions of data item 350. In another embodiment, Image Layer 300 may include the original version of data item 351, as represented by block 351A, while Image Layer 310 may include a more recent version of data item 351, illustrated by block 351B.

Please note that different letters, such as 351A and 351B, illustrate different versions of the same data item, such as data item 351. For ease of discussion, a data item number without any letter, such as data item 355, may refer collectively to all the versions of a data item, whereas a data item number with a letter may refer to an individual version of a data item. For example, Image Layer 300 may include data item 355A; Image Layer 310 may include data item 355B; and Image Layer 320 may include data item 355C.

In one embodiment, two additional data items, data items 356 and 357, may have been added to the data image in Image Layer 310, and one additional data item, data item 358, may have been added to the data image in Image Layer 358.

The actual amount of data stored in a single data item may vary according to different embodiments. In one embodiment, a data item may represent the standard block size of the physical storage medium used by a storage device. For example, in some embodiments, a data item may represent the standard network message payload size while in other embodiments a data item may represent a single record in a particular database. In other embodiments, a data item may represent a fixed size extent that is a multiple of the standard block size for that storage. Alternatively, in yet other embodiments, a data item may be of variable size and may, in certain embodiments, represent an entire file.

Figure 4:
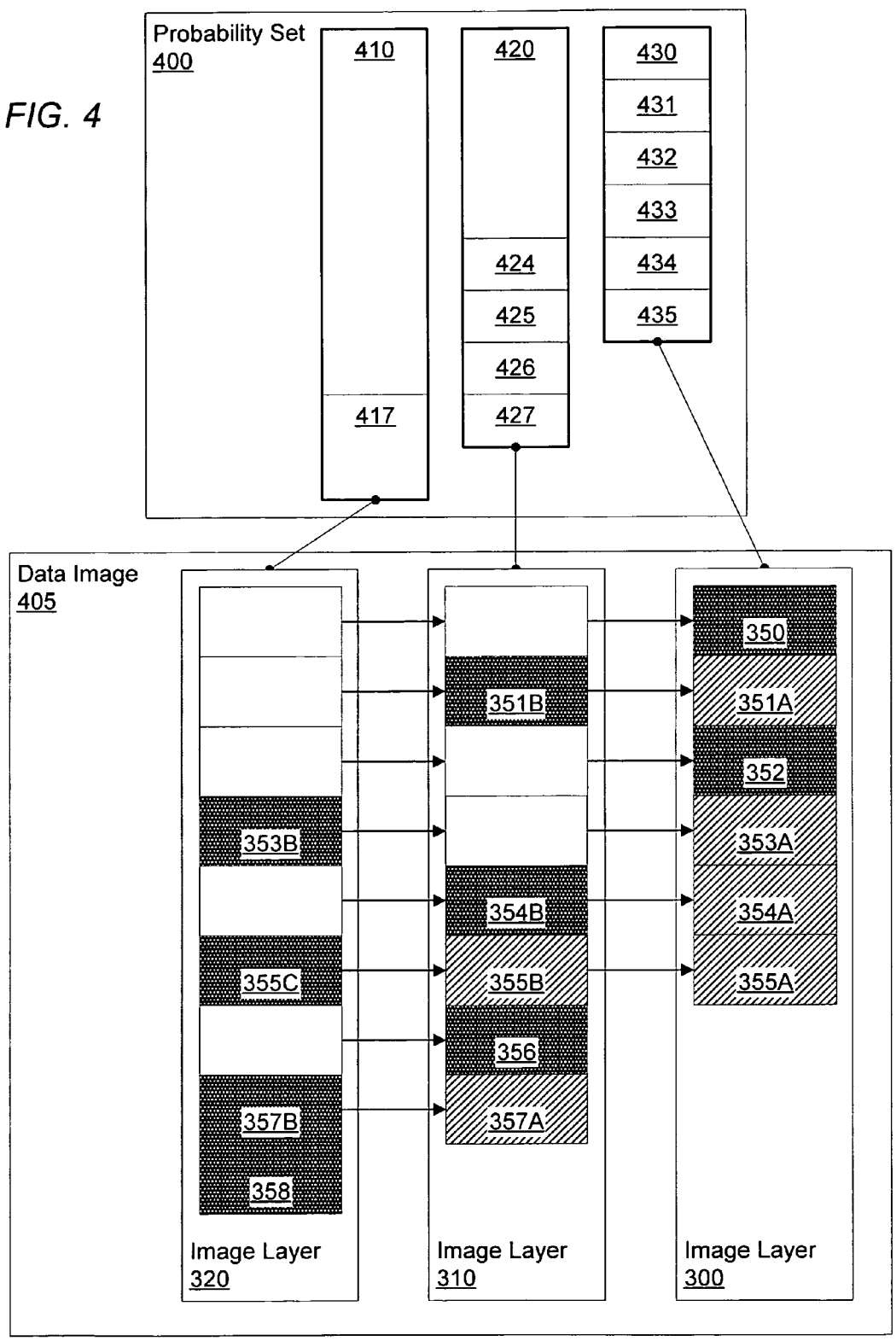
FIG. 4 is a block diagram illustrating the use of variable granularity probabilities for locating data in a sparse data images.

FIG. 4 illustrates, according to one embodiment a set of probabilities indicating the likelihood that a particular data image layer of Data Image 405 includes the latest version of a data item. Probability Set 400 includes data relating to the likelihood that Image Layer 300, Image Layer 310 or Image Layer 320, includes the latest version of any of the data items included in Data Image 405. In one embodiment, Probability Set 400 includes a set of probabilities corresponding to each image layer. For instance, in one embodiment, probabilities 430-435 correspond to the likelihood that Image Layer 300 includes the most recent versions of data items 350-355, respectively. FIG. 4, illustrates just one of many ways to represent, maintain and use probabilities. The number of and nature of probabilities used to locate data in a data image may vary according to different embodiments. For instance, in one embodiment, the individual probabilities maintained in Probability Set 400 may comprise numbers representing the percentage of times that the most recent version of a data item has been found in a corresponding Image Layer. For example, in one embodiment, probability 430 may indicate that Image Layer 300 has a high percentage chance of having the most recent version of data item 350, since it may be the one data image layer to include a version of data item 350.

According to one embodiment, Probability Set 400 may be maintained based on the historical success of finding data items and therefore Probability Set 400 may indicate the data image layer most likely to contain the most recent version of a data item, and not necessarily the data image layer that actually contains the most recent version of the data item. In other words, if a more recent version of a data item has been written to a data image layer, but not yet read from that layer, Probability Set 400 may not have been updated to reflect that information. For example, Probability Set 400 may indicate that Image Layer 310 is most likely to contain the most recent version of data item 357. Even though the most recent version of data item 357, namely 357B is in Image Layer 320 it may never have been read from Image Layer 320 and therefore Probability Set 400 may not reflect that fact that. Probability Set 400 may instead reflect that historically Image Layer 310 is more likely to contain the most recent version of data item 357.

Additionally, FIG. 4 illustrates, according to one embodiment, how the granularity of maintained probabilities may change as more data is acquired. In one embodiment, a probability set may initially include a single probability indicating the likelihood of finding the most recent version of any data item in a particular data image layer. As data items are successfully located in that layer, the range of possible data items may be grouped by the likelihood of finding them in that image layer, and individual data items may be represented by individual probabilities.

For example, when a new data image layer, say Image Layer 320, is added to Data Image 405, Probability Set 400 may have no data relating to which data items are included in that particular data image layer. Correspondingly, in one example, Probability Set 400 may include a single probability indicating that the most recent version of any data item is unlikely to be found in Image Layer 320. In such an example, the latest versions of data items 357B and 358 may subsequently be found in Image Layer 320 and Probability Set 400 may then provide a separate probability indicating the likelihood of finding either of those most recent versions (of data items 357 and 358) in Image Layer, while still grouping the likelihood of finding the most recent version of any other data item in Image Layer 320 using one (possibly lower) probability. Blocks 410 and 417 in Probability Set 400 illustrate such an example.

Similarly, the probabilities associated with Image Layer 310 may indicate the likelihood of finding versions of variously sized groups of data items. For example, in one embodiment, Probability Set 400 may include block 420 that may represent the likelihood of finding the most recent version of data items 350-353 in Image Layer 310. Data items 350-353 may be grouped together with a single probability because there may be a similar likelihood of finding the most recent version of any of them (data items 350-353) in Image Layer 310. In another embodiment, the likelihood of finding the most recent versions of data items 350-353 may be represented by a single probability in Probability Set 400 because no data has been collected regarding finding versions of those data items in Image Layer 310. In that same example, the likelihood of finding the most recent versions of data items 354-357 may be represented by individual probabilities in Probability Set 400, as illustrated by block 424-427 in FIG. 4.

Additionally, Image Layer 300 may represent the oldest image layer in Data Image 405 and therefore more information may have been integrated into Probability Set 400 regarding finding versions of individual data items in that layer. Therefore, Probability Set 400 may include individual probabilities indicating the likelihood of finding the most recent versions of specific data items in Image Layer 300, as illustrated by blocks 430-435.

Figure 5:
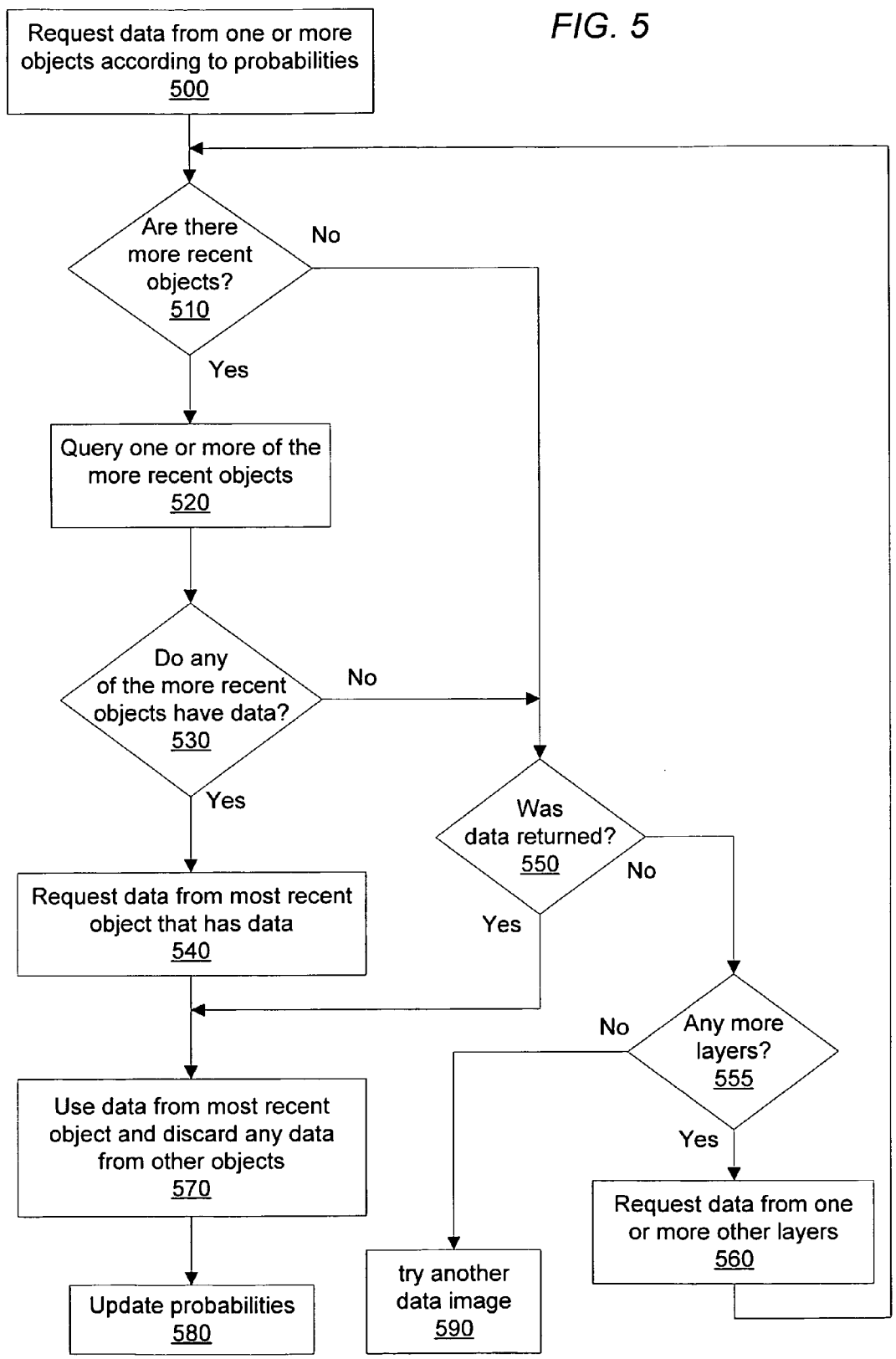
FIG. 5 is a flowchart illustrating a method for probabilistic data locating according to one embodiment.

FIG. 5 illustrates a flowchart of a method for probabilistic data locating, according to one embodiment. When locating data in a data image comprising one or more data image layers stored on one or more sparse data objects, a client or server may maintain probabilities indicating the chance of finding the latest version of a data item in any particular layer of the data image. For ease of description, a client is used in the following description of the method illustrated by the flowchart in FIG. 5, however, it should be noted that such a client may be any device or process accessing storage devices and using probabilities to locate data in a data image, as described herein. In various embodiments, such a client may in actuality be a metadata server, or other application.

As described above regarding FIG. 4, probabilities may be maintained using the historical success of finding a particular data item in a particular data image layer and may not reflect the existence of a version of a data item in a more recently created data image layer. Therefore, in some embodiments, a client may request the data from one or more data image layers that are historically more likely to include the data item, while querying more recent data image layers to determine if a newer version of the data item exists but is not yet reflected in the probabilities.

As illustrated by block 500, a client may request the data item from one or more data objects according to the probabilities. In one embodiment, the client may request the data item for the single most likely data image layer, while in another embodiment, the client may request the data item from multiple data image layers likely to include the data item.

After determining whether there are data image layers more recent than the one or more image layers from which the client requested the data item, as illustrated by block 510, the client may then query one or more of the more recent data image layers, if such exist, to determine whether they include a version of the data item, as illustrated by block 520. In on embodiment, the client may always query the most recent data image layer. In another embodiment, the client may query all of the more recent data image layers. In yet other embodiments, the client may consult the probabilities to determine which of the more recent data image layers to query. For example, Image Layer 300 may contain data item 353A and Image Layer 320 may contain data item 353B, while Image Layer 310 may not contain any version of data item 353. In such an example, Probability Set 400 may indicate Image Layer 310 has a zero percentage chance of having the most recent version of data item 353 and therefore a client may not query Image Layer 310, but only Image Layer 320 when locating data item 353.

If, as illustrated by the positive exit from decision block 530, at least one of the more recent data image layers includes a version of the data item, the client may request the data item from the most recent of the more recent data image layers that include a version of the data item, as illustrated by block 540. For instance, Image Layers 310 and 320 may both contain versions of data item 357, and therefore a client, after querying both layers, may request data from Image Layer 320 since it may be the most recent of the two data image layers.

If, as illustrated by the negative exit from decision block 510, there are no more recent data image layers, the client will determine if any of the originally requested data image layers returned a version of the data item, as illustrated by decision block 550. In one embodiment, a client may have received multiple versions of the data item from multiple data image layers. For example, using an embodiment illustrated by FIG. 4, a client may first request data item 355 from Image Layer 310, and may query Image Layer 320, since Image Layer 320 may be more recent than Image Layer 320, to determine if Image Layer 320 include a version of data item 355. Image Layer 320 may return a positive answer to the client's query, in which case, the client may then request data item 355 from Image Layer 320. In such an example, the client may receive data item 355B from Image Layer 310 and data item 355C from Image Layer 320.

If, according to one embodiment, a client receives multiple versions of a particular data item from different data image layers, that client may, as illustrated in block 570, use the data item from the most recent layer and discard any data received from other, older data image layers. After acquiring the most recent version of the data item, the client may, as illustrated by block 580, update the probabilities based on the particular data image layer that contains the most recent version of the data item, and whether any other data image layers contain other versions of the data item.

If a client is unable to locate any version of the data item from either the data image layers initially indicated by the probabilities or from any more recent data image layer, the client may determine that there are additional untried data image layers that may include a version of the data item, as illustrated by decision block 555. If there are additional data image layers, the client may request data from one or more of them, as illustrated by block 560. In one embodiment, a client may query all remaining layers to find out which, if any, include versions of the data item and request the data item from the most recent remaining layer that contains a version of the data, similar to querying and requesting the more recent data image layers described above. In other embodiments, a client may request the data item from the each remaining data image layer in turn, starting with the more recent layer until either finding the data item, or until there are no more untried layers, as illustrated by the negative exit from decision block 555. If a client has tried every layer in the data image without finding a version of the data item, the data image may contain a hole at that logical data location. In one embodiment, if every layer in a data image has been tried without finding the desired data item, a client may attempt to locate the data item in another data image, as illustrated by block 590. In another embodiment, a client may have tried all relevant data images without locating the data item, and therefore may perform some sort of error processing. For example, a client may report such an error in a log, or, in some embodiments, the client may inform some supervisory process capable of checking and repairing the data integrity of the file image.

Figure 6:
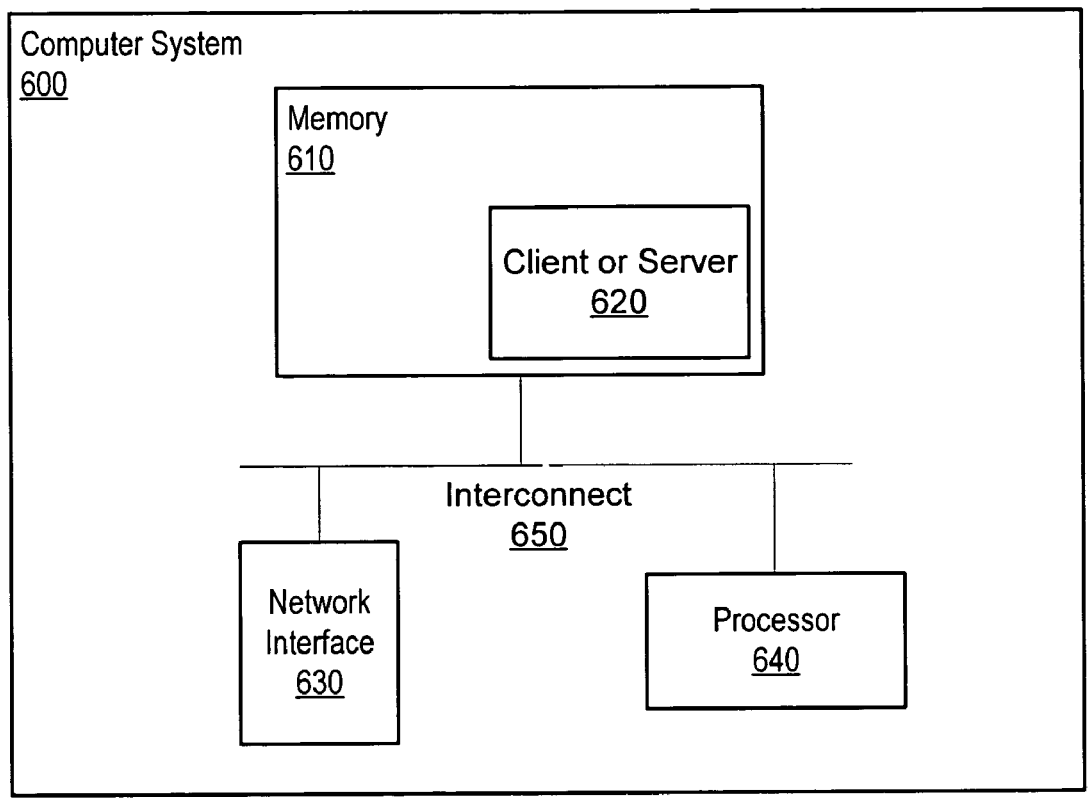
FIG. 6 is a block diagram illustrating, according to one embodiment a computer system that may be configured to implement externally managed frozen file images.

FIG. 6 illustrates a computing system capable of probabilistically locating data as described above and according to various embodiments. Computer system 600 may be any of various types of devices, including, but not limited to, a personal computer system, desktop computer, laptop or notebook computer, mainframe computer system, handheld computer, workstation, network computer, a consumer device such as a mobile phone, pager, PDA, a smart appliance, or any type of networkable peripheral device such as storage devices, switches, modems, routers, etc, or in general any type of computing device. Computer system 600 may include at least one Processor 640. Processor 640 may couple across one or more Interconnects 650 to Memory 610 and one or more Network Interfaces 630. Network Interfaces 630 may be any of various types of interfaces configured to couple with and communicate over Network 100 illustrated in FIG. 1 and described above.

Memory 610 is representative of various types of possible memory media, also referred to as "computer accessible media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof.

In some embodiments, Memory 610 may include program instructions configured to maintain probabilities and use such probabilities to locate data on a data image comprising one or more data image layers stored using sparse data objects as described above. In certain embodiments Memory 610 may include program instructions configured to implement a client or server, such as illustrated by block 620. In one embodiment, such a client or server may include program instructions configured to utilize probabilities to locate data in sparse data image layers.

Although the embodiments above have been described in detail, numerous variations and modifications will become apparent once the above disclosure is fully appreciated. It is intended that the following claims be interpreted to embrace all such variations and modifications.

What is claimed is:

1. A method, comprising:
    storing a data image comprising a plurality of data items, wherein the data image comprises a plurality of sparse data images stored as a plurality of data image layers, wherein at least some of the plurality of data image layers include a version of one or more of the data items which has changed relative to a prior version of the one or more data items included in another one of the plurality of data image layers, and wherein at least some of the plurality of data image layers do not include one or more data items that are included in one or more others of the plurality of data image layers;
    maintaining, for each of the plurality of data items, one or more probabilities indicating the likelihood that a particular data image layer includes a most recent version of the data item; and
    acquiring the most recent version of one of the plurality of data items, wherein said acquiring comprises:
        requesting the one of the plurality of data items from one or more primary data image layers according to the one or more probabilities for the one of the plurality of data items; and
        updating the one or more probabilities for the one of the plurality of data items based on results of said requesting.

2. The method of claim 1, wherein said acquiring further comprises:
    querying one or more secondary data image layers to determine if any of the secondary data image layers comprise a version of the one of the plurality of data items, wherein the secondary data image layers are more recent than the primary data image layers; and
    updating the one or more probabilities for the one of the plurality of data items based on results of said querying.

3. The method of claim 2, wherein said acquiring further comprises:
    in response to determining that one or more of the secondary data image layers comprise a version of the one of the plurality of data items:
        requesting the one of the plurality of data items from the most recent of the secondary data image layers that comprise a version of the one of the plurality of data items; and
        discarding any data acquired by said requesting the one of the plurality of data items from the primary data image layers.

4. The method of claim 3, wherein said acquiring further comprises:
    in response to determining that one or more of the secondary data image layers comprise a version of the one of the plurality of data items:
        canceling said requesting the one of the plurality of data items from the primary data image layers.

5. The method of claim 2, further comprising:
    in response to not acquiring any data from said requesting the one of the plurality of data items from the primary data image layers and in response to determining that none of the secondary data image layers comprise a version of the one of the plurality of data items:
        requesting the one of the plurality of data items from one or more additional data image layers distinct from both the primary data image layers and the secondary data image layers; and
        updating the one or more probabilities for the one of the plurality of data items based on results of said requesting the one of the plurality of data items from the additional data image layers.

6. The method of claim 1, wherein said acquiring further comprises:
    requesting the one of the plurality of data items from one or more secondary data image layers, wherein the secondary data image layers are more recent than the primary data image layers; and
    updating the one or more probabilities for the one of the plurality of data items based on results of said requesting the one of the plurality of data items from the secondary data image layers.

7. A device, comprising:
    a processor; and
    a memory coupled to the processor, wherein the memory comprises program instructions executable by the processor to:
        store a data image comprising a plurality of data items, wherein the data image comprises a plurality of sparse data images stored as a plurality of data image layers, wherein at least some of the plurality of data image layers include a version of one or more of the data items which has changed relative to a prior version of the one or more data items included in another one of the plurality of data image layers, and wherein at least some of the plurality of data image layers do not include one or more data items that are included in one or more others of the plurality of data image layers;
        maintain, for each of the plurality of data items, one or more probabilities indicating the likelihood that a particular data image layer includes a most recent version of the data item; and
        acquire the most recent version of one of the plurality of data items, wherein said acquiring comprises:
            requesting the one of the plurality of data items from one or more primary data image layers according to the one or more probabilities for the one of the plurality of data items; and
            updating the one or more probabilities for to the one of the plurality of data items based on results of said requesting.

8. The device of claim 7, wherein in said acquiring the program instructions are executable to:
    query one or more secondary data image layers to determine if any of the secondary data image layers comprise a version of the one of the plurality of data items, wherein the secondary data image layers are more recent than the primary data image layers; and
    update the one or more probabilities for the one of the plurality of data items based on results of said querying.

9. The device of claim 8, wherein in said acquiring the program instructions are executable to:
    in response to determining that one or more of the secondary data image layers comprise a version of the one of the plurality of data items:

request the one of the plurality of data items from the most recent of the secondary data image layers that comprise a version of the one of the plurality of data items; and discard any data acquired by said requesting the one of the plurality of data items from the primary data image layers.

10. The device of claim 9, wherein in said acquiring the program instructions are executable to:

in response to determining that one or more of the secondary data image layers comprise a version of the one of the plurality of data items:

cancel said requesting the one of the plurality of data items from the primary data image layers.

11. The device of claim 8, wherein the program instructions are further executable to:

in response to not acquiring any data from said requesting the one of the plurality of data items from the primary data image layers and in response to determining that none of the secondary data image layers comprise a version of the one of the plurality of data items:

request the one of the plurality of data items from one or more data additional image layers distinct from both the primary data image layers and the secondary data image layers; and update the one or more probabilities for the one of the plurality of data items based on results of said requesting the one of the plurality of data items from the additional data image layers.

12. The device of claim 7, wherein in said acquiring the program instructions are executable to:

request the one of the plurality of data items from one or more secondary data image layers wherein the secondary data image layers are more recent than the primary data image layers; and update the one or more probabilities for the one of the plurality of data items based on results of said requesting the one of the plurality of data items from the secondary data image layers.

13. A computer accessible storage medium, storing program instructions computer-executable to implement:

storing a data image comprising a plurality of data items, wherein the data image comprises a plurality of sparse data images stored as a plurality of data image layers, wherein at least some of the plurality of data image layers include a version of one or more of the data items which has changed relative to a prior version of the one or more data items included in another one of the plurality of data image layers, and wherein at least some of the plurality of data image layers do not include one or more data items that are included in one or more others of the plurality of data image layers;

maintaining, for each of the plurality of data items, one or more probabilities indicating the likelihood that a particular data image layer includes a most recent version of the data item; and acquiring the most recent version of a one of the plurality of data items, wherein said acquiring comprises:

requesting the one of the plurality of data items from one or more primary data image layers according to the one or more probabilities for the one of the plurality of data items; and updating the one or more probabilities for the one of the plurality of data items based on results of said requesting.

14. The computer accessible storage medium of claim 13, wherein in said acquiring the program instructions are computer-executable to implement:

querying one or more secondary data image layers to determine if any of the secondary data image layers comprise a version of the one of the plurality of data items, wherein the secondary data image layers are more recent than the primary data image layers; and updating the one or more probabilities for the one of the plurality of data items based on results of said querying.

15. The computer accessible storage medium of claim 14, wherein in said acquiring the program instructions are computer-executable to implement:

in response to determining that one or more of the secondary data image layers comprise a version of the one of the plurality of data items:

requesting the one of the plurality of data items from the most recent of the secondary data image layers that comprise a version of the one of the plurality of data items; and discarding any data acquired by said requesting the one of the plurality of data items from the primary data image layers.

16. The computer accessible storage medium of claim 15, wherein in said acquiring the program instructions are computer-executable to implement:

in response to determining that one or more of the secondary data image layers comprise a version of the one of the plurality of data items:

canceling said requesting the one of the plurality of data items from the primary data image layers.

17. The computer accessible storage medium of claim 14, wherein the program instructions are further computer-executable to implement:

in response to not acquiring any data from said requesting the one of the plurality of data items from the primary data image layers and in response to determining that none of the secondary data image layers comprise a version of the one of the plurality of data items:

requesting the one of the plurality of data items from one or more additional data image layers distinct from both the primary data image layers and the secondary data image layers; and updating the one or more probabilities for the one of the plurality of data items based on results of said requesting the one of the plurality of data items from the additional data image layers.

18. The computer accessible storage medium of claim 13, wherein in said acquiring the program instructions are computer-executable to implement:

requesting the one of the plurality of data items from one or more secondary data image layers, wherein the secondary data image layers are more recent than the primary data image layers; and updating the one or more probabilities for the one of the plurality of data items based on results of said requesting the one of the plurality of data items from the secondary data image layers.

* * * * *